(12) United States Patent
Reeb

(10) Patent No.: US 8,002,336 B2
(45) Date of Patent: Aug. 23, 2011

(54) COMPARTMENT MOUNTED AT AN UNDERSIDE OF AN UPPER FRAME OF A CONSTRUCTION EQUIPMENT

(75) Inventor: Jörg Reeb, Merzig (DE)

(73) Assignee: Volvo Construction Equipment AB, Eskilstuna (SE)

( * ) Notice: Subject to any disclaimer, the term of this patent is extended or adjusted under 35 U.S.C. 154(b) by 92 days.

(21) Appl. No.: 12/518,454

(22) PCT Filed: Dec. 21, 2006

(86) PCT No.: PCT/SE2006/001478
§ 371 (c)(1),
(2), (4) Date: Jun. 10, 2009

(87) PCT Pub. No.: WO2008/076016
PCT Pub. Date: Jun. 26, 2008

(65) Prior Publication Data
US 2010/0289297 A1   Nov. 18, 2010

(51) Int. Cl.
*B62D 25/00* (2006.01)
(52) U.S. Cl. ............ 296/193.07; 296/37.14; 296/204
(58) Field of Classification Search ............ 296/193.07, 296/204, 37.14; 224/282, 495, 502
See application file for complete search history.

(56) References Cited

U.S. PATENT DOCUMENTS

| | | | | |
|---|---|---|---|---|
| 1,453,362 A | * | 5/1923 | Loveland | 280/164.1 |
| 2,936,918 A | * | 5/1960 | Vais | 224/42.23 |
| 3,464,606 A | * | 9/1969 | Nordeen | 224/281 |
| 3,764,048 A | * | 10/1973 | Gore | 296/37.14 |
| 4,087,032 A | * | 5/1978 | Miller et al. | 296/37.2 |
| 4,576,319 A | * | 3/1986 | Brown | 296/37.1 |
| 4,948,169 A | * | 8/1990 | Amundson | 296/37.6 |

FOREIGN PATENT DOCUMENTS

| | | |
|---|---|---|
| EP | 1609701 A1 | 12/2005 |
| JP | 8100444 A | 4/1996 |
| JP | 9125455 A | 5/1997 |
| JP | 2000064346 A | 2/2000 |
| JP | 2000154560 A | 6/2000 |
| JP | 2002070071 A | 3/2002 |
| JP | 2002066378 A | 9/2002 |
| JP | 2005155070 A | 6/2005 |
| JP | 2006028783 A | 2/2006 |

OTHER PUBLICATIONS

International Search Report for corresponding International Application PCT/SE2006/001478.
International Preliminary Report on Patentability for corresponding International Application PCT/SE2006/001478.
European Search Report for corresponding EP 06 82 4538.

* cited by examiner

*Primary Examiner* — Lori Lyjak
(74) *Attorney, Agent, or Firm* — WRB-IP LLP

(57) ABSTRACT

Construction equipment includes an undercarriage on which an upper frame is mounted, especially in the form of an excavator or crane. At an underside of the upper frame at least one flap and/or at least one compartment is arranged which can be open and closed and which is adapted such that a component of the construction equipment can be operated or is accessible or can be stored when the flap or compartment is open, or such that a compartment is provided for a fuel filler pump, a fuel suction hose, tools, accessories and/or spare parts.

13 Claims, 9 Drawing Sheets

COMPARTMENT MOUNTED AT AN UNDERSIDE OF AN UPPER FRAME OF A CONSTRUCTION EQUIPMENT

BACKGROUND AND SUMMARY

The invention relates to a construction equipment comprising a lower carriage or undercarriage on which an upper carriage or upper frame is mounted. (In the following the terms "undercarriage" and "upper frame", respectively, are used to designate these units.) In many such construction equipments, the upper frame is mounted in such a way on the undercarriage that it can be rotated in a horizontal plane. The invention especially relates to such a construction equipment in the form of an excavator or crane or another construction vehicle.

When designing such a construction equipment, it is often difficult to position certain components of the construction equipment appropriately such that they are accessible in an easy and comfortable manner for an operator or driver of the construction equipment, because the space is usually very limited. Such components are e.g. a fuel filler pump, a fuel suction hose, certain hydraulic or electric devices, or compartments for tools, accessories, operation valves or spare parts, etc.

Furthermore, it is desirable that such components are protected against a possible damage during the operation of the construction equipment and against damaging environmental influences like e.g. dirt, dust, water, ice, snow, heat, etc.

In view of these problems, it is desirable to provide a construction equipment as mentioned in the opening paragraph, in which components as exemplarily mentioned above are accessible in an easy manner and at the same time are protected against damage and said environmental influences.

According to an aspect of the present invention, in construction equipment comprising an upper frame to be mounted on an undercarriage, wherein at least one flap and/or at least one compartment is mounted by means of an assembly unit at an underside of the upper frame, such that the at least one flap and/or compartment can be moved or operated between an open and a closed position.

Generally, it is to be noted that the compartment or flap can also be provided in the form of a locker or box. However, in the following description, the terms compartment or flap are used for designating all these possible alternatives.

By providing the compartment or flap at an underside of the upper frame, it is easy to access and to open it by a person standing on the ground or on the undercarriage, as the case may be, due to its low position in comparison to the length of the operator or driver of the construction equipment and his/her relative position to the compartment or flap. Furthermore, at the underside of the upper frame, the compartment or flap is widely protected against damage and the above mentioned environmental influences.

Another advantage is that even in an open position, the compartment or flap and its content is widely protected against rain, snow, ice, dirt, dust, etc. due to its position at the underside of the upper frame.

Furthermore, one or more of such compartments or flaps can be provided around the upper frame at its underside so that any free space within the upper frame can be used according to its size by compartments or flaps with accordingly adapted sizes, for storing various components or providing compartments as mentioned above.

Furthermore, such a flap can also be positioned at an appropriate place at the underside of the upper frame in order to easily provide access to a component of the construction equipment when the flap is open, so that e.g. maintenance of certain components can be conducted in a quick and easy way.

It will be appreciated that features of the invention are susceptible to being combined in any combination without departing from the scope of the invention as defined by the accompanying claims.

BRIEF DESCRIPTION OF THE DRAWINGS

Further details, features and advantages of the invention become apparent from the following description of preferred and exemplary embodiments of the invention which are given with reference to the drawings, in which shows.

DETAILED DESCRIPTION

Figure 1:
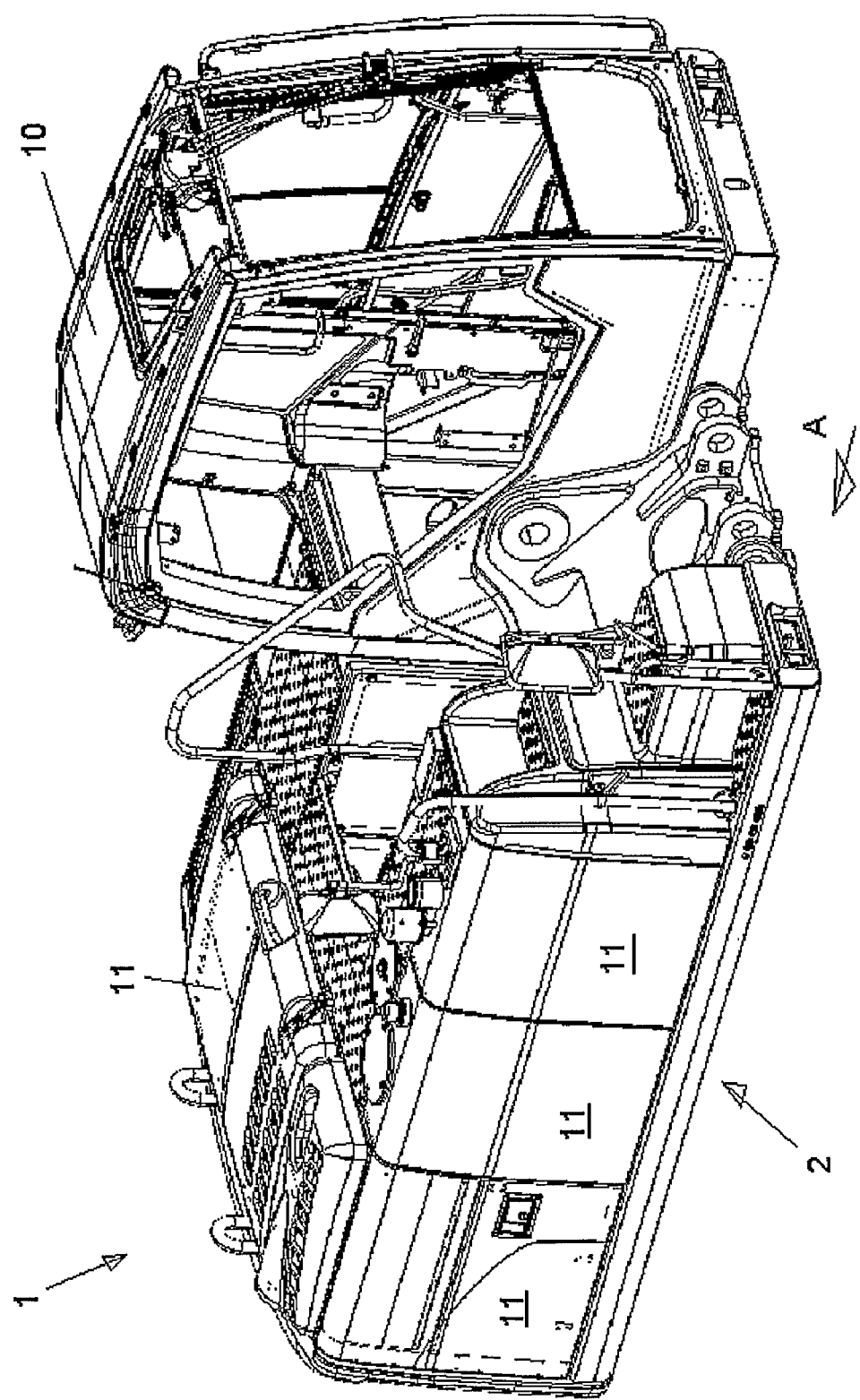
FIG. 1 a perspective total view of an upper frame of a construction equipment.

In the accompanying Figures, an underlined number represents an item over which the underlined number is positioned. A non-underlined number relates to an item identified by a line linking the non-underlined number to the item. When a number is non-underlined and accompanied by an associated arrow, the nonunderlined number is used to identify a general item at which the arrow is pointing.

In all Figures the same reference numerals designate the same or corresponding components or parts of the embodiments of the invention.

FIG. 1 shows a perspective total view of substantial parts of an upper frame 1 of a construction equipment, here in this and the following Figures by way of an example in the form of an excavator. The upper frame 1 generally comprises a driver cabin 10, fuel tanks 11, a boom, an engine, gears, and other components (which are not shown in this Figure) for operating the construction equipment, most of which are arranged behind related covers of the upper frame 1. As generally known, the upper frame 1 is mounted at its underside 2 in a horizontally turnable or rotatable manner on a lower carriage or undercarriage (which is not shown in this Figure). In case of construction vehicles like excavators, the undercarriage usually is equipped with wheels in order to drive, move or dislocate the vehicle.

Figure 2:
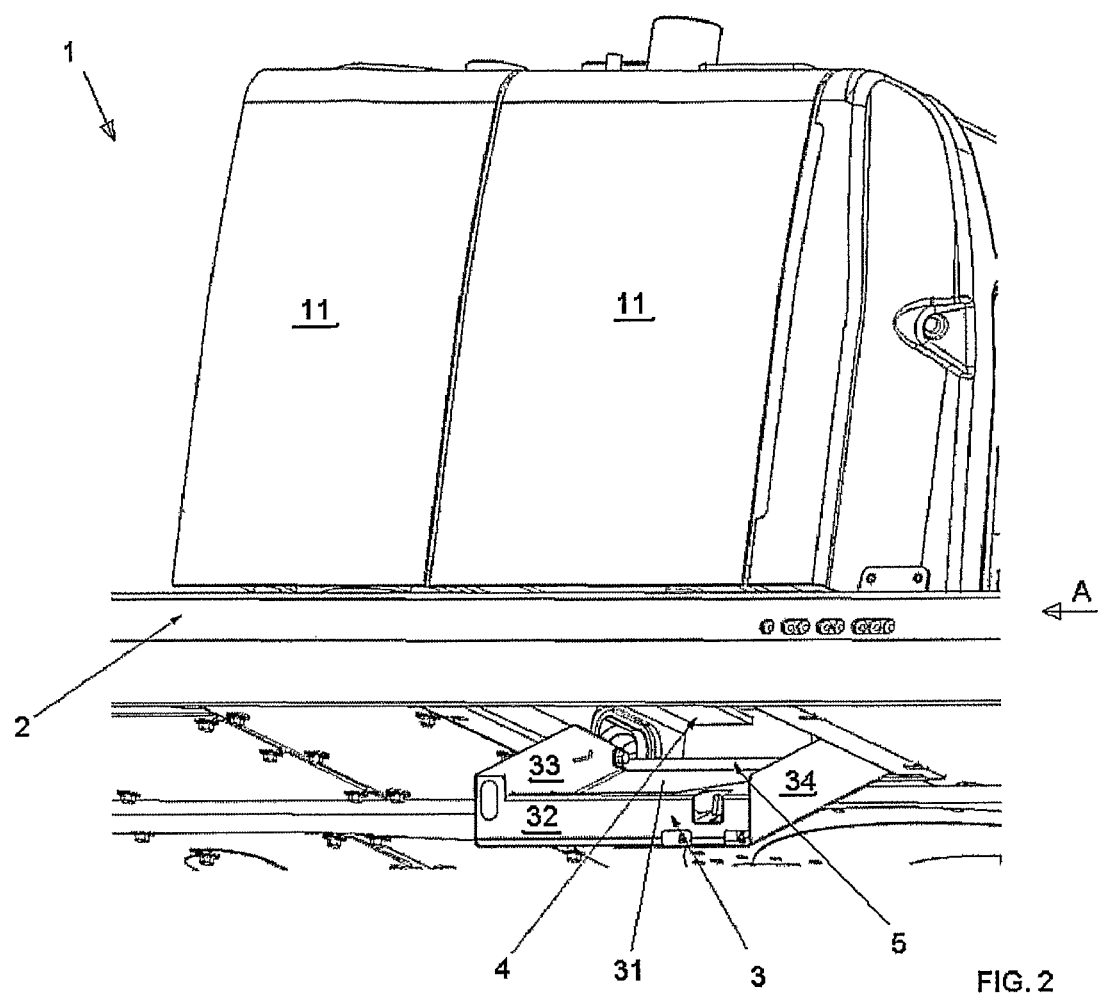
FIG. 2 a perspective side view of a part of an upper frame of a construction equipment with a first embodiment of a compartment according to the invention in an open position.

In the enlarged perspective side view of FIG. 2, a cutout of the upper frame 1 of Figure with two fuel tanks 11 is schematically shown. However, instead of fuel tanks 11, covers can as well be provided at these places for covering certain other components.

The upper frame 1 is provided at its underside 2 with a first embodiment of a compartment 3 according to the invention which is shown in an open position in which the compartment 3 is pivoted downwards. The position of the compartment 3 at the upper frame 1 is preferably selected such that either a free space 4 is available for storing the compartment 3 in its closed position within the upper frame 1 so that the above mentioned equipment or components can be arranged within the compartment 3, or a certain component within the upper frame 1 (like e.g. a certain hydraulic or electric device) is accessible when the compartment 3 is open.

The form and dimensions of the compartment 3 are either selected in dependence on the space 4 which is available within the upper frame 1 for the compartment 3 and/or in dependence on the geometrical size of the equipment or components to be arranged or stored within the compartment 3.

The compartment 3 according to FIG. 2 has at least substantially the form of a parallelepiped comprising a bottom plate 31 and three side walls 32, 33, 34 extending perpendicularly from the bottom plate 31. This first embodiment of the compartment 3 is mounted in a rotatable or turnable manner by means of an exemplary assembly unit at the underside 2 of the upper frame 1, wherein the assembly unit is provided in the form of an edge, preferably a rear edge 5 of the compartment 3 which is pivotally mounted at the underside 2 of the upper frame 1 so that the compartment 3 can be opened and closed by tilting it down and up, respectively.

Figure 3:
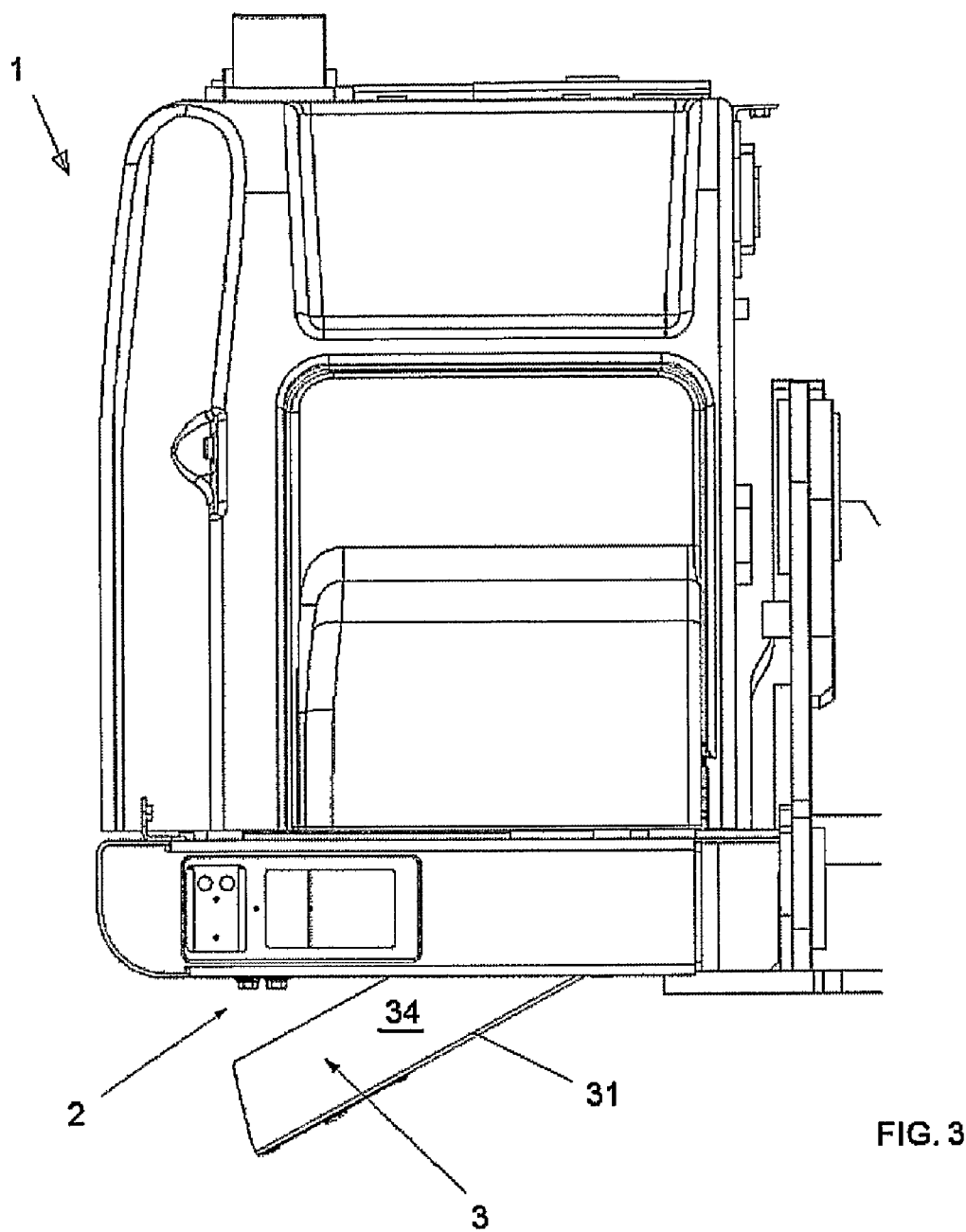
FIG. 3 a front view of the part of the upper frame according to FIG. 2.

FIG. 3 shows a front view of the upper frame 1 of FIG. 2 from the right (according to arrow A in FIGS. 1 and 2) in a cross section through the upper frame 1, wherein one side wall 34 and the bottom plate 31 of the first embodiment of the compartment 3 in its open position is shown. From this Figure it is apparent that in order to open and close the compartment 3, it is guided along a rotational path, i.e. tilted down and up, respectively, or by turning it in a downward and upward direction, respectively, around its rear edge.

FIG. 4 again shows a schematic enlarged perspective side view similarly to FIG. 2 in the form of a cutout of the upper frame of FIG. 1. The upper frame 1 is provided at its underside 2 with a second embodiment of a compartment 3 according to the invention which is shown in an open position.

Regarding the position of this compartment 3 at the upper frame 1 and the form and dimensions of this compartment 3, it is referred to the related explanations with respect to the first embodiment.

Again, this second embodiment of the compartment 3 has at least substantially the form of a parallelepiped comprising a bottom plate 31 and a first, a second and a third side wall 32, 33, 34, and a fourth side wall (not shown) at the rear of the compartment 3 extending at least substantially perpendicularly from the bottom plate 31.

However, deviating from the first embodiment, the second embodiment of the compartment 3 comprises an exemplary assembly unit in the form of four rods 51, 52, 53, 54, wherein a first and a second rod 51, 52 extends between the second side wall 33 of the compartment 3 and the underside 2 of the upper frame 1, and the third and fourth rod 53, 54 extends between the third side wall 34 and the underside 2 of the upper frame 1. The rods 51, 52, 53, 54 are pivotally fastened both at the second and third side wall 33; 34, respectively, and the underside 2 of the upper frame 1.

Figure 4:
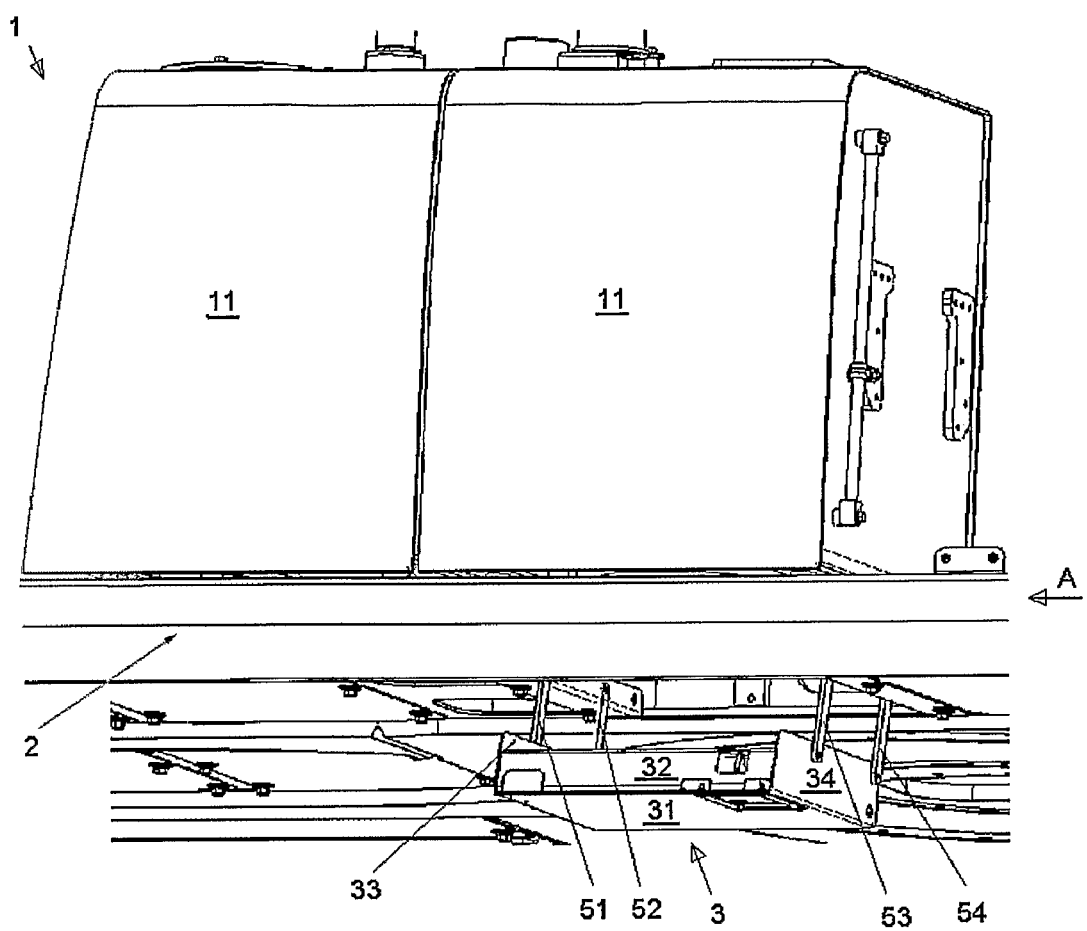
FIG. 4 a perspective side view of a part of an upper frame of a construction equipment with a second embodiment of a compartment according to the invention in an open position.
Figure 5:
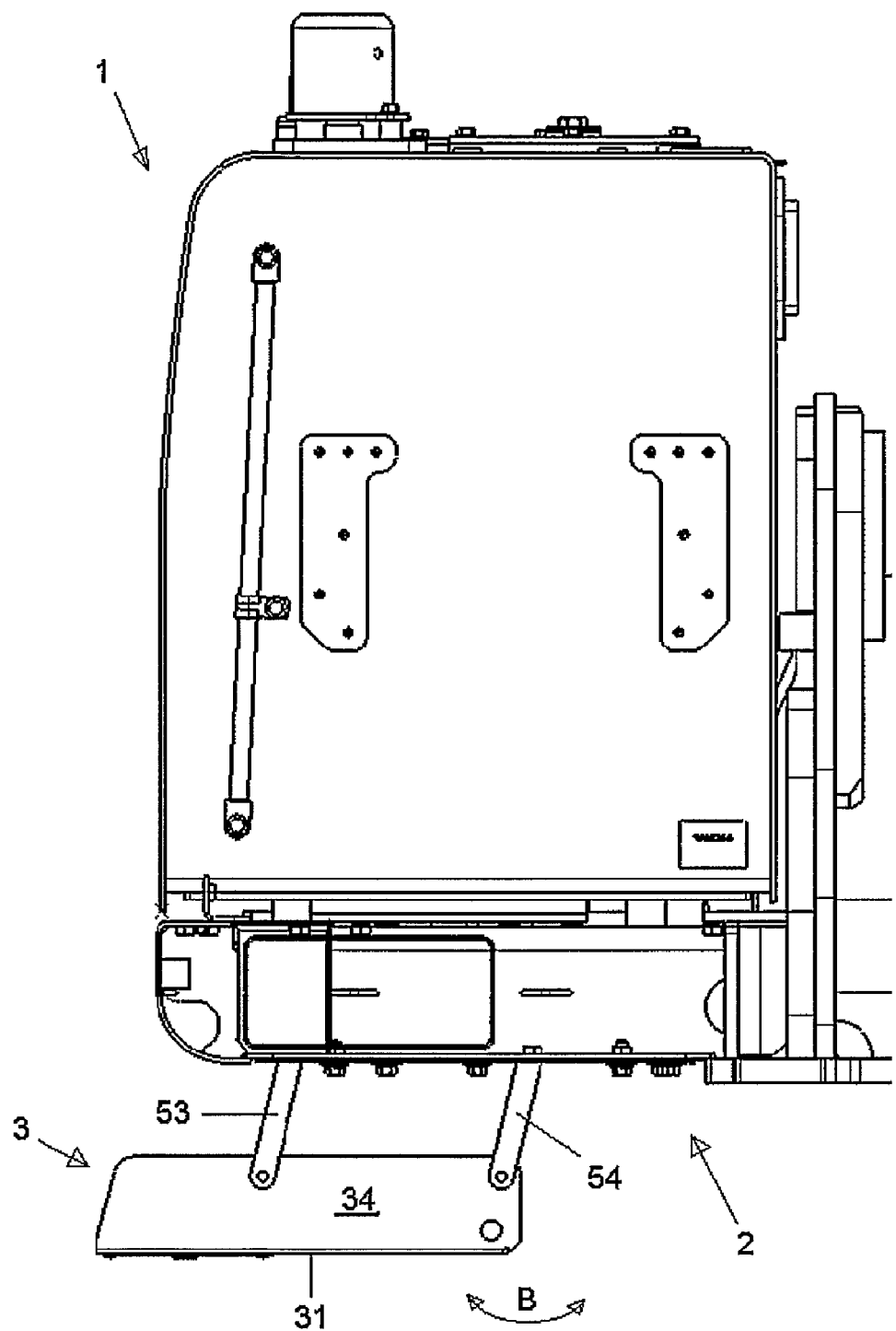
FIG. 5 a front view of the part of the upper frame according to FIG. 4.

FIG. 5 shows a front view of the upper frame 1 of FIG. 4 again from the right according to arrow A in FIG. 4 in a cross section through the upper frame 1 wherein the third side wall 34 and the bottom plate 31 of the second embodiment of the opened compartment 3 is indicated.

Furthermore, the third and the fourth rod 53, 54 are shown. By pivotally mounting the rods 51, 52, 53, 54 both at the underside of the upper frame 1 and at the related side wall 33; 34 of the compartment 3, the compartment 3 can be opened and closed by swiveling it according to arrow B in FIG. 5 by substantially parallelly shifting it along a curved motion path or a combined translational and rotational path.

FIG. 6 again shows a schematic enlarged perspective side view similarly to FIG. 4 in the form of a cutout of the upper frame of FIG. 1. The upper frame 1 is provided at its underside 2 with a third embodiment of a compartment 3 according to the invention which is shown in an open position.

Regarding the position of this compartment 3 at the upper frame 1 and the form and dimensions of this compartment 3, it is again referred to the related explanations with respect to the first and second embodiment.

Again, this third embodiment of the compartment 3 has at least substantially the form of a parallelepiped comprising a bottom plate 31 and a first, a second, a third side wall 32, 33, 34, and a fourth side wall (not shown) at the rear of the compartment 3, extending at least substantially perpendicularly from the bottom plate 31.

The third embodiment of the compartment 3 is provided with an exemplary assembly unit in the form of an extractable and retractable assembly unit for parallelly shifting the compartment 3 along a straight or linear motion path (translational path), in contrary to the first and second embodiment, in which the assembly unit is provided for rotating or parallelly shifting the compartment 3 along a curved motion path, in order to open and to close it.

Figure 6:
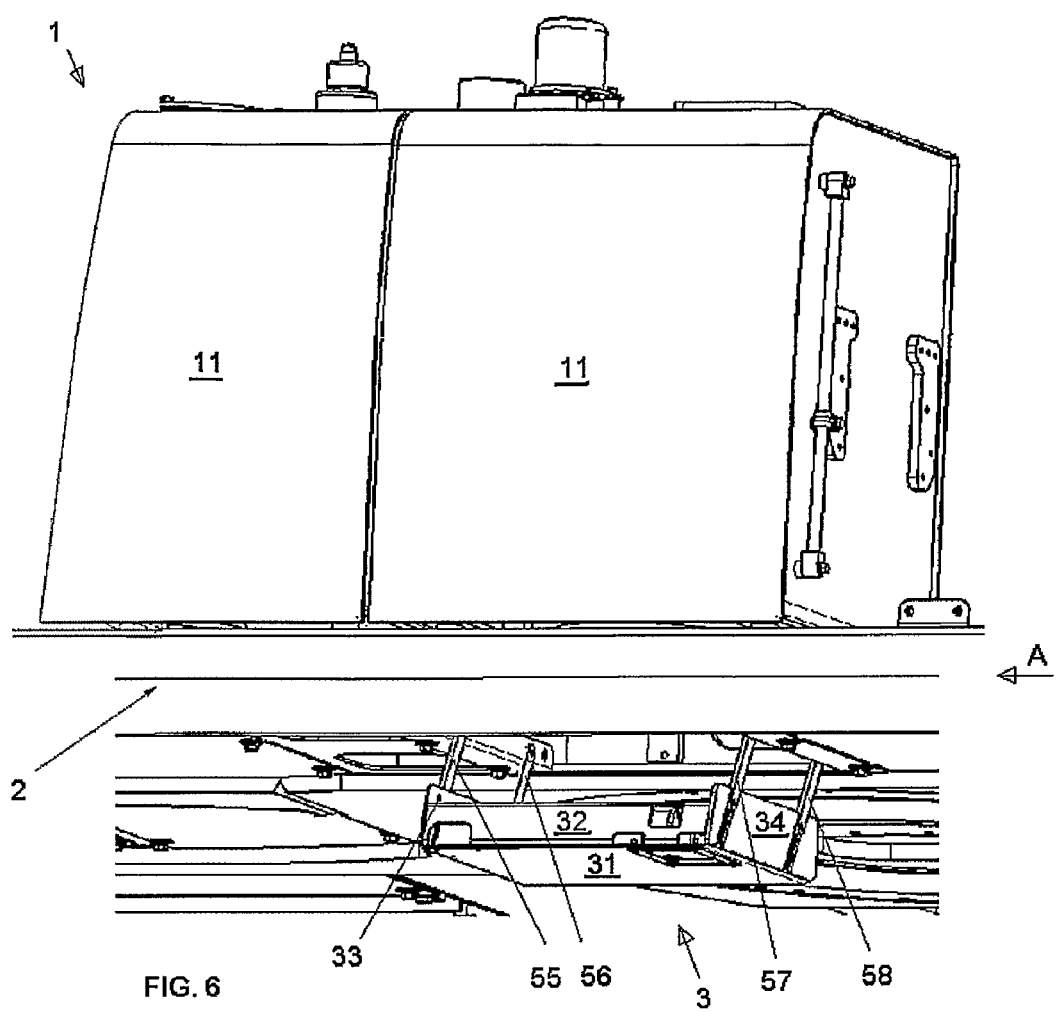
FIG. 6 a perspective side view of a part of an upper frame of a construction equipment with a third embodiment of a compartment according to the invention in an open position.

More in detail, this assembly unit comprises according to FIG. 6 four rods 55, 56, 57, 58, wherein a first and a second rod 55, 56 is fastened between the second side wall 33 of the compartment 3 and the underside 2 of the upper frame 1, and the third and fourth rod 57, 58 is fastened between the third side wall 34 and the underside 2 of the upper frame 1.

Furthermore, the second side wall 33 is provided with a first and a second guiding or rail, and the third side wall 34 is provided with a third and a fourth guiding or rail, each for guidingly fastening the rods 55, 56, 57, 58 at the compartment 3, so that in order to open and close the compartment 3, it can be parallelly shifted along a substantially straight or linear motion path.

Figure 7:
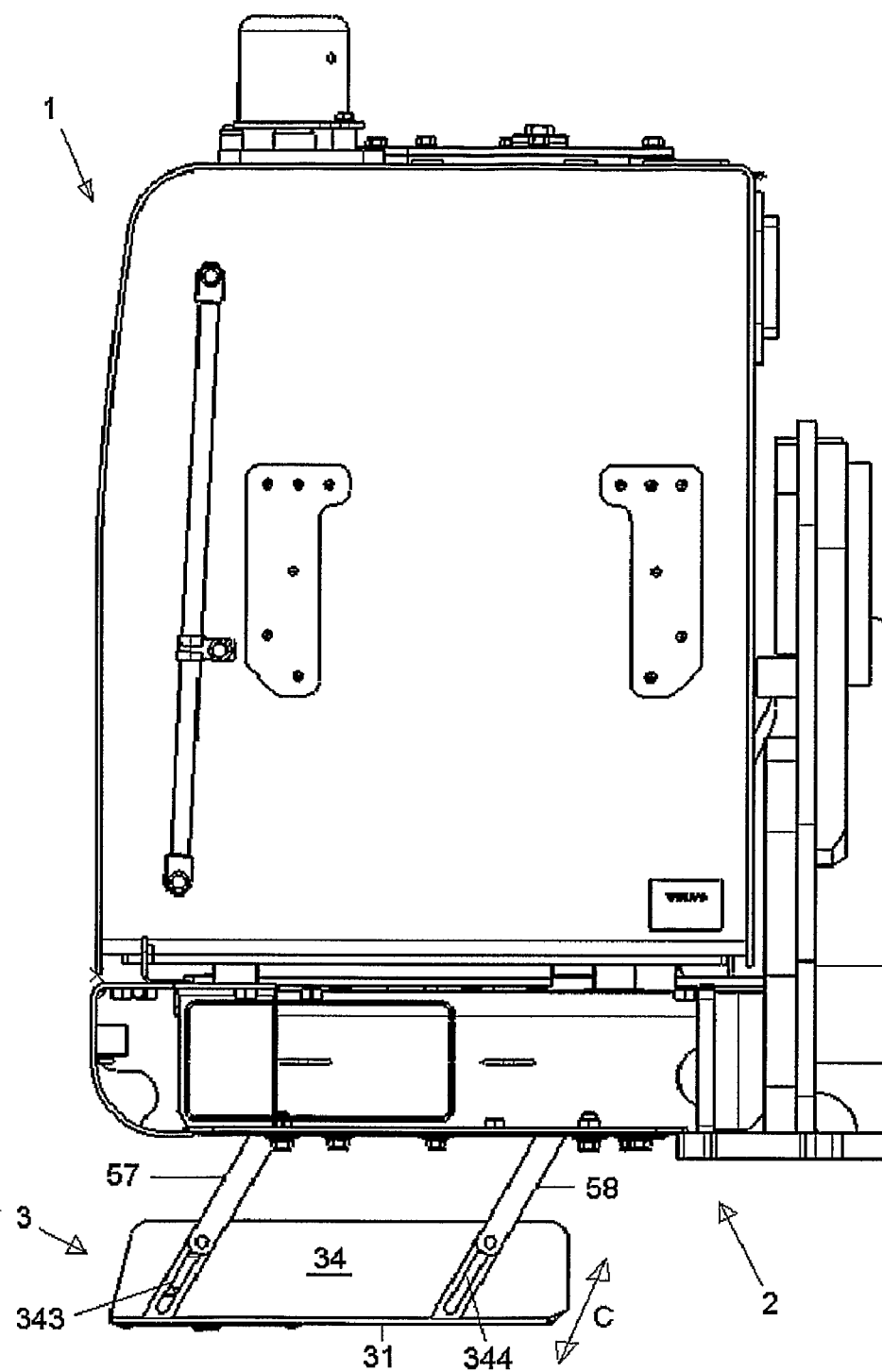
FIG. 7 a front view of the part of the upper frame according to FIG. 6.

FIG. 7 shows a front view of the upper frame 1 of FIG. 6, again from the right according to arrow A in FIG. 6 in a cross section through the upper frame 1 wherein the third side wall 34 and the bottom plate 31 of the third embodiment of the opened compartment 3 is indicated. Furthermore, the third rod 57, the third guiding 343, the fourth rod 58 and the fourth guiding 344 is shown.

As exemplarily indicated in FIG. 7 for the third and the fourth guiding 343, 344, all guidings are provided each in the form of a slit-like rail which extends in a longitudinal direction of the related rod and in which e.g. a roll (not shown) of the related rod is guided, so that the compartment 3 can be opened and closed by parallelly shifting it along a substantially straight or linear motion path as indicated by arrow C in FIG. 7. Alternatively, instead of a roll, a cylindrical pin mounted perpendicular at the corresponding rods 55-58 could be used which is slideably moving within the guidings or rails.

In order to have the compartment 3 of this third embodiment in its closed position completely embedded into the underside 2 of the upper frame 1, the rods 55-58 are preferably each movable along further guidings or rails (not shown) mounted inside the upper frame 1. In this case, the guidings and rails 343, 344 mounted at the compartment 3 are not necessary while the corresponding guidings and rails mounted inside the upper frame 1 are necessary for completely embedding the compartment 3 into the underside 2. Of course, both types of guidings or rails can be used in order to avoid that guidings or rails mounted inside the upper frame are extending too much into the inner space of the upper frame 1 and/or are extending into the available access space between the compartment and the upper frame in case the compartment 3 is in its opened position.

As an alternative to the guidings or rails mounted inside the upper frame 1, the rods 55-58 according to FIGS. 6 and 7 can be pivotally connected to the upper frame 1 as described in connection with the second embodiment, so that the compartment 3 can be opened and closed by additionally swiveling it according to arrow B in FIG. 5 along a curved motion path in combination with the above mentioned substantially straight or linear motion path (arrow C in FIG. 7).

An extractable and retractable assembly unit could also be provided by means of rods which are telescopically extractable and retractable, so that no guidings or rails would be needed at the second and third side wall 33, 34 of the compartment 3 and/or inside the upper frame 1.

FIG. 8 again shows a schematic enlarged perspective side view similarly to FIGS. 2, 4 and 6 in the form of a cutout of the upper frame of FIG. 1, in which the compartment 3 is turned up into its closed position. From this Figure it can be seen that the bottom plate 31 of the closed compartment 3 is forming an integral part of the underside 2 of the upper frame 1, in which it lies in an at least substantially common plane with the surrounding underside 2 of the upper frame 1. By this, the compartment 3 is in its closed position completely embedded into the underside 2 of the upper frame 1.

In its position at or in the underside 2 of the upper frame 1, the compartment 3 is widely protected against rain, snow, ice, dust or dirt, as well as against damage during operation of the construction equipment.

Figure 8:
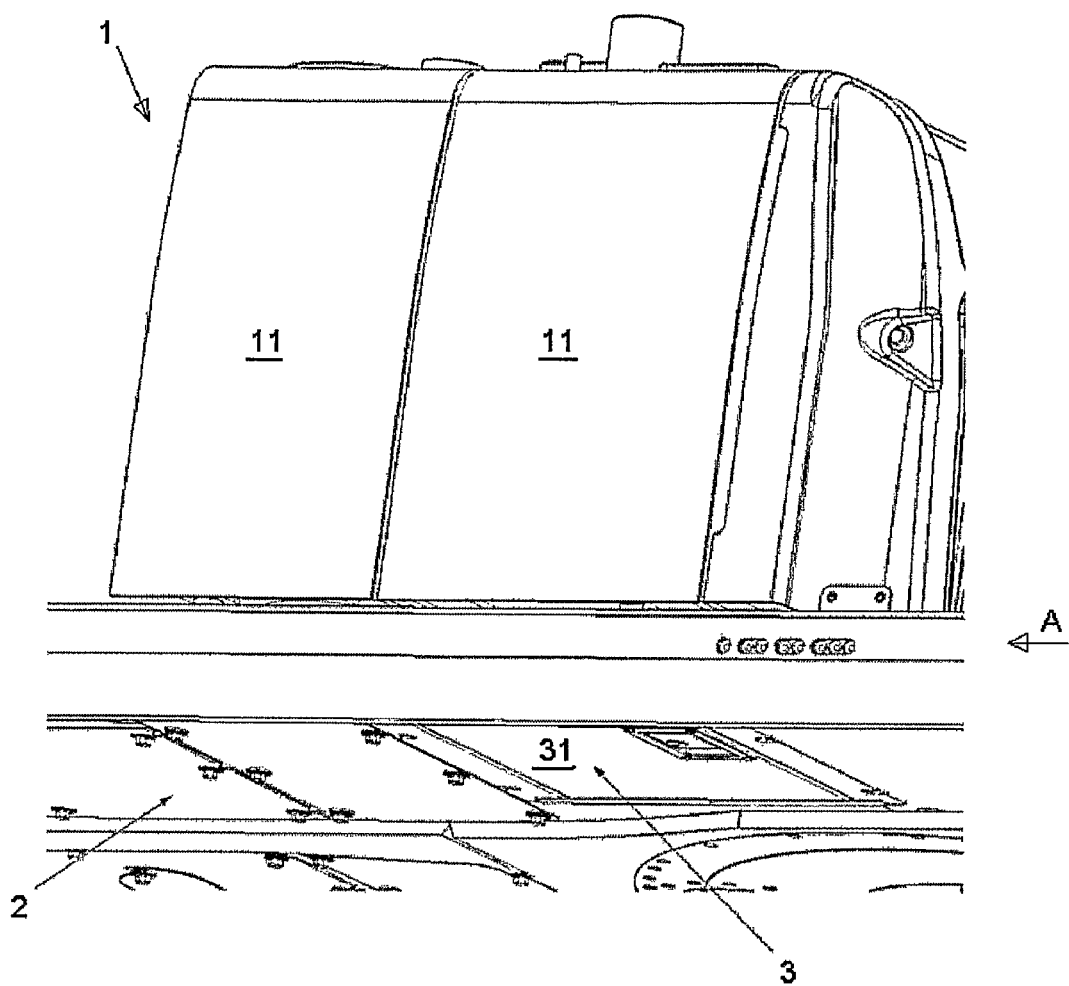
FIG. 8 a perspective side view of the part of the upper frame with the compartment in a closed position.
Figure 9:
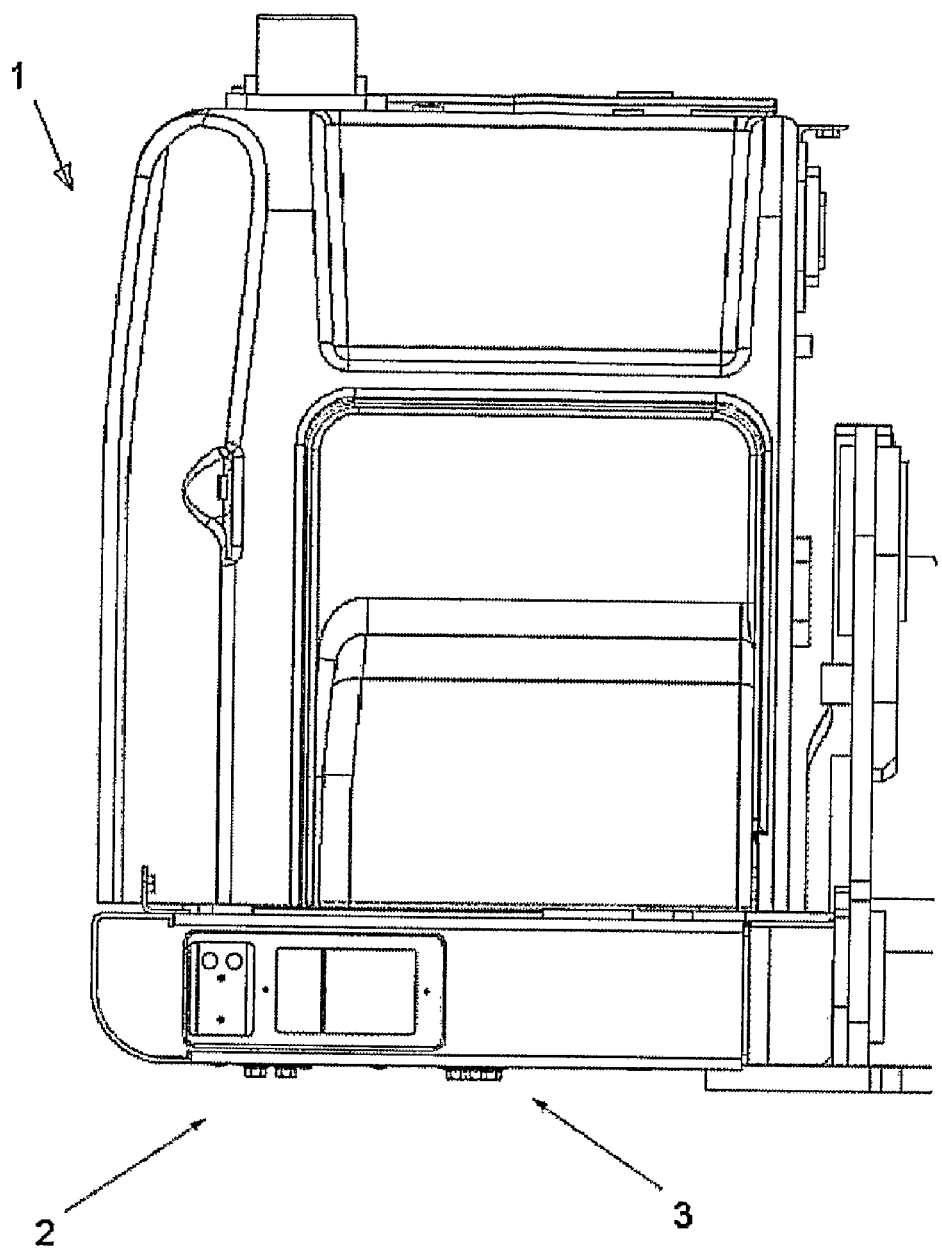
FIG. 9 a front view of the part of the upper frame according to FIG. 8.

FIG. 9 shows a front view of the upper frame 1 of FIG. 8 from the right (arrow A in FIG. 8) in which again a section through the upper frame 1 is indicated. From this Figure it is apparent that the compartment 3 does not project from the surrounding underside 2 of the upper frame 1 in its closed position, but is embedded into the underside 2 or lies in an at least substantially common plane with the underside 2 of the upper frame 1.

The compartment 3 is preferably provided with a snap closure, or a lock in order to prevent an unauthorized opening, or it is held closed e.g. by means of screws.

Generally, it is to be noted that modifications to embodiments of the invention described in the foregoing are possible without departing from the scope of the invention as defined by the accompanying claims.

Furthermore, expressions such as "including", "comprising", "incorporating", "consisting of", "have", "is" used to describe and claim the present invention are intended to be construed in a non-exclusive manner, namely allowing for items, components or elements not explicitly described also to be present.

Finally, numerals included within parentheses in the accompanying claims are intended to assist understanding of the claims and should not be construed in any way to limit subject matter claimed by these claims.

The invention claimed is:

1. Construction equipment comprising an upper frame which is mounted at an underside of the upper frame on an undercarriage, wherein the upper frame is provided at an underside of the upper frame with at least one compartment, wherein the at least one compartment is mounted by an assembly unit at the underside of the upper frame such that the at least one compartment can be moved or operated in a downward and upward direction between an open and a closed position, respectively.

2. Construction equipment according to claim 1, wherein the assembly unit is provided such that at least one of the compartments is, in a closed position of the compartment, embedded or at least substantially embedded into the upper frame, or a bottom plate of the compartment lies in a plane or at least substantially in a plane with the surrounding underside of the upper frame.

3. Construction equipment according, to claim 1, wherein the assembly unit is provided for moving or operating the at least one of the compartments between the open and the closed position along one of a translational, a rotational, or a combined translational and rotational motion path.

4. Construction equipment according to claim 3, wherein the assembly unit is provided in the form of one edge of the at least one of the compartments which is pivotally mounted at the underside of the upper frame, so that the at least one of the compartments can be rotated or turned between the closed position and the open position in which the compartment is tilted downwards, along a rotational motion path.

5. Construction equipment according to claim 3, wherein the assembly unit is provided in the form of at least one swiveling beam rod which is pivotally mounted between the underside of the upper frame and the compartment, so that the at least one of the compartments can be parallelly shifted along a curved motion path in the form of a combined translational and rotational motion path between the closed position and the open position in which the compartment is tilted downwards.

6. Construction equipment according to claim 3, wherein the assembly unit is extractable and retractable for parallelly shifting the compartment along a linear or straight or translational motion path between the closed position and the open position.

7. Construction equipment according to claim 6, wherein the assembly unit comprises four beams or rods and four rails or guidings at at least one of the compartment and inside the upper frame, which rails or guidings are provided each for guidingly fastening the beams or rods at the at least one of the compartment and the inside the upper frame in a longitudinal direction of the related beam or rod for parallelly shifting the compartment along a linear or straight or translational motion path between the closed position and the open position.

8. Construction equipment according to claim 6, wherein the extractable and retractable assembly unit is provided in the form of four telescopically extractable and retractable beams or rods which are mounted between the underside of the upper frame and the compartment so that the compartment can be parallelly shifted along a linear or straight or translational motion path between the closed position and the open position.

9. Construction equipment according to claim 1, wherein the at least one compartment has at least substantially the form of a parallelepiped comprising a bottom plate and at least three side walls extending at least substantially perpendicularly from the bottom plate.

10. Construction equipment according to claim 1, wherein the at least one compartment is adapted with respect to dimensions of the compartment and positioned at the underside such that one or more components of the construction equipment can be operated or are accessible or can be stored in the compartment when the compartment is open.

11. Construction equipment according to claim 1, wherein the at least one compartment is adapted with respect to geometrical dimensions of the compartment such that a compartment for at least one of a fuel filler pump, a fuel suction hose, tools, accessories and spare parts is provided.

12. Construction equipment according to claim 1, wherein at least one of the compartments can be locked or comprises a snap closure.

13. Construction equipment according to claim 1 in the form of an excavator.

* * * * *